US012604143B2

(12) United States Patent
Yan et al.

(10) Patent No.: US 12,604,143 B2
(45) Date of Patent: Apr. 14, 2026

(54) SOUND DEVICE

(71) Applicant: AAC Microtech (Changzhou) Co., Ltd., Changzhou (CN)

(72) Inventors: Xudong Yan, Changzhou (CN); Tao Shao, Changzhou (CN); Xiaojiang Gu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 321 days.

(21) Appl. No.: 18/325,074

(22) Filed: May 29, 2023

(65) Prior Publication Data

US 2024/0236580 A1 Jul. 11, 2024

Related U.S. Application Data

(63) Continuation of application No. PCT/CN2023/072790, filed on Jan. 18, 2023.

(30) Foreign Application Priority Data

Jan. 5, 2023 (CN) ......................... 202320028750.4

(51) Int. Cl.

| | |
|---|---|
| ***H04R 9/06*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |

(52) U.S. Cl.

CPC ............. *H04R 9/063* (2013.01); *H04R 1/025* (2013.01); *H04R 7/04* (2013.01); *H04R 7/18* (2013.01); *H04R 9/025* (2013.01); *H04R 2400/11* (2013.01)

(58) Field of Classification Search

CPC .......... H04R 1/24; H04R 1/403; H04R 9/063; H04R 1/025; H04R 7/04; H04R 7/06; H04R 7/18; H04R 9/025; H04R 2400/11

See application file for complete search history.

(56) References Cited

U.S. PATENT DOCUMENTS

2018/0317014 A1 * 11/2018 Bellas .................. H04R 1/1008

FOREIGN PATENT DOCUMENTS

CN 211959524 U * 11/2020

* cited by examiner

*Primary Examiner* — Daniel R Sellers
*Assistant Examiner* — Tyler Michael Liebgott
(74) *Attorney, Agent, or Firm* — Wiersch Law Group

(57) ABSTRACT

A sound device includes a frame, a first vibration system, a second vibration system, and a magnetic circuit system. The first vibration system includes a first vibrating diaphragm and a first voice coil. The second vibration system includes a second vibrating diaphragm and a second voice coil. The first vibrating diaphragm includes a first vibrating portion, a first folding ring portion, and a first dome. The second vibrating diaphragm includes a second vibrating portion, a second folding ring portion, and a second dome. The second dome and the first dome are both metal domes. The sound device improves heat dissipation effect of the sound device through the first dome of a metal structure and the second dome of a metal structure, and improves heat dissipation effect of vehicle-mounted sound boxes to a great extent when the sound device is applied to the vehicle-mounted sound boxes.

7 Claims, 5 Drawing Sheets

SOUND DEVICE

TECHNICAL FIELD

The present disclosure relates to a field of electroacoustic conversion, and in particular to a sound device.

BACKGROUND

Sound devices are energy conversion devices for converting electric signals into acoustic signals, and are mainly divided into two modes of a single-vibration system sound device and a double-vibration system sound device. The single-vibration system sound device is a sound device using a single-sided vibrating diaphragm to vibrate and sound, and the double-vibration system sound device is a sound device using a double-sided vibrating diaphragm to vibrate and sound.

Vehicle-mounted sound boxes are conventional applications for the sound devices. In order to reduce a weight of vehicle, the current vehicle-mounted sound boxes adopt a plastic housing and a vibrating diaphragm made of single-sided non-metal materials to sound. Due to a fact that the vehicle-mounted sound boxes made of the non-metal materials have no heat conduction structure, heat dissipation effect of the vehicle-mounted sound boxes is poor, which affects normal use of the vehicle-mounted sound boxes.

Therefore, it is necessary to provide a new sound device to solve above technical problems.

SUMMARY

The present disclosure aims to provide a sound device which is applied to vehicle-mounted sound boxes and has good heat dissipation effects.

In order to achieve above purpose, the present disclosure provides the sound device, including a frame, a first vibration system, a second vibration system, and a magnetic circuit system.

The first vibration system includes a first vibrating diaphragm and a first voice coil. The first vibrating diaphragm is fixed to a first side of the frame. The first voice coil is configured to drive the first vibrating diaphragm to vibrate and generate sound.

The second vibration system includes a second vibrating diaphragm and a second voice coil. The second vibrating diaphragm is fixed to a second side of the frame. The second voice coil is configured to drive the second vibrating diaphragm to vibrate and generate sound.

The magnetic circuit system is fixed to the frame and located between the first vibrating diaphragm and the second vibrating diaphragm. A first magnetic gap is defined in one side, close to the first vibration system, of the magnetic circuit system. A second magnetic gap is defined in one side, close to the second vibration system, of the magnetic circuit system. The first voice coil is inserted and suspended within the first magnetic gap. The second voice coil is inserted and suspended within the second magnetic gap.

The first vibrating diaphragm includes a first vibrating portion, a first folding ring portion, and a first dome. The first folding ring portion is annular. The first folding ring portion is bent and extends from an outer periphery of the first vibrating portion. The first dome is attached and fixed to the first vibrating portion. An outer periphery of the first folding ring portion is fixed to the frame.

The second vibrating diaphragm includes a second vibrating portion, a second folding ring portion, and a second dome. The second folding ring portion is annular. The second folding ring portion is bent and extends from an outer periphery of the second vibrating portion. The second dome is attached and fixed to the second vibrating portion. An outer periphery of the second folding ring portion is fixed to the frame. The second dome and the first dome are both metal domes.

Furthermore, one side, distal from the magnetic circuit system, of the first dome is of a first plane structure. One side, distal from the magnetic circuit system, of the second dome is of a second plane structure.

Furthermore, the first vibration system further includes a plurality of first elastic components and a plurality of first supporting columns. The plurality of the first elastic components are fixed to the frame and disposed at intervals. The plurality of the first supporting columns are disposed at intervals on one side, close to the magnetic circuit system, of the first dome. One end, distal from the first dome, of each of the plurality of the first supporting columns is connected to one of the plurality of the first elastic components.

The second vibration system further includes a plurality of second elastic components and a plurality of second supporting columns. The plurality of the second elastic components are fixed to the frame and disposed at intervals. The plurality of the second supporting columns are disposed at intervals on one side, close to the magnetic circuit system, of the second dome. The plurality of the second elastic components and the plurality of the first elastic components are disposed in a staggered mode. One end, distal from the second dome, of each of the plurality of the second supporting columns is connected to one of the plurality of the second elastic components.

Furthermore, the plurality of the first supporting columns and the first dome are integrally formed in an injection molding insert mode. The plurality of the second supporting columns and the second dome are integrally formed in an injection molding insert mode.

Furthermore, the plurality of the first elastic components include four first elastic components, and the plurality of the first supporting columns include four first supporting columns. The plurality of the second elastic components include four second elastic components, and the plurality of the second supporting columns include four second supporting columns.

Furthermore, the frame includes a first frame and a second frame. The second frame is stacked and fixed to the first frame. The outer periphery of the first folding ring portion is fixed to one side, distal from the second frame, of the first frame. The outer periphery of the second folding ring portion is fixed to one side, distal from the first frame, of the second frame. The magnetic circuit system is fixed to the second frame. The plurality of the first elastic components are fixed to one side, close to the second frame, of the first frame. The plurality of the second elastic components are fixed to one side, close to the first frame, of the second frame.

Furthermore, the magnetic circuit system includes a magnetic steel, a first pole core, a second pole core, a support frame, and a third pole core. The first pole core is stacked and fixed to one side, close to the first vibrating diaphragm, of the magnetic steel. The second pole core is stacked and fixed to one side, distal from the first pole core, of the magnetic steel. The support frame is disposed around the magnetic steel and fixedly connected to the second pole core. The third pole core is disposed around the support frame and fixedly connected to one end, distal from the second pole core, of the support frame. The support frame is disposed at intervals with the magnetic steel and the third pole core. The third pole core is fixed to the second frame. The first pole core and the third pole core are disposed at intervals to form the first magnetic gap. The second pole core and the third pole core are disposed at intervals to form the second magnetic gap.

Furthermore, the second frame further includes a plurality of fixing arms and a circumferential wall. The plurality of the fixing arms extend inwards from a periphery of the one side, close to the first frame, of the second frame. The circumferential wall is connected to the plurality of the fixing arms and surrounds the third pole core. An outer side of the third pole core is attached and fixed to an inner side of the circumferential wall.

Furthermore, the sound device further includes an upper housing and a lower housing. The upper housing includes a first through hole. The lower housing covers the upper housing and includes a second through hole. The second through hole is disposed opposite to the first through hole. The first frame is fixed to the upper housing and enables the first vibrating diaphragm to directly face the first through hole. The second frame is fixed to the lower housing and enables the second vibrating diaphragm to directly face the second through hole. The upper housing, the lower housing, and the sound device jointly define a sound inner cavity.

Compared with related art, the sound device of the present disclosure provides double-diaphragm vibration systems, and the first dome in the first vibrating diaphragm and the second dome in the second vibrating diaphragm are made into the metal domes, so that the sound device performs double-sided heat dissipation through the first dome of a metal structure and the second dome of a metal structure, which improves heat dissipation effect of the sound device, and improves the heat dissipation effect of the vehicle-mounted sound boxes to a great extent when the sound device is applied to the vehicle-mounted sound boxes.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

Figure 1:
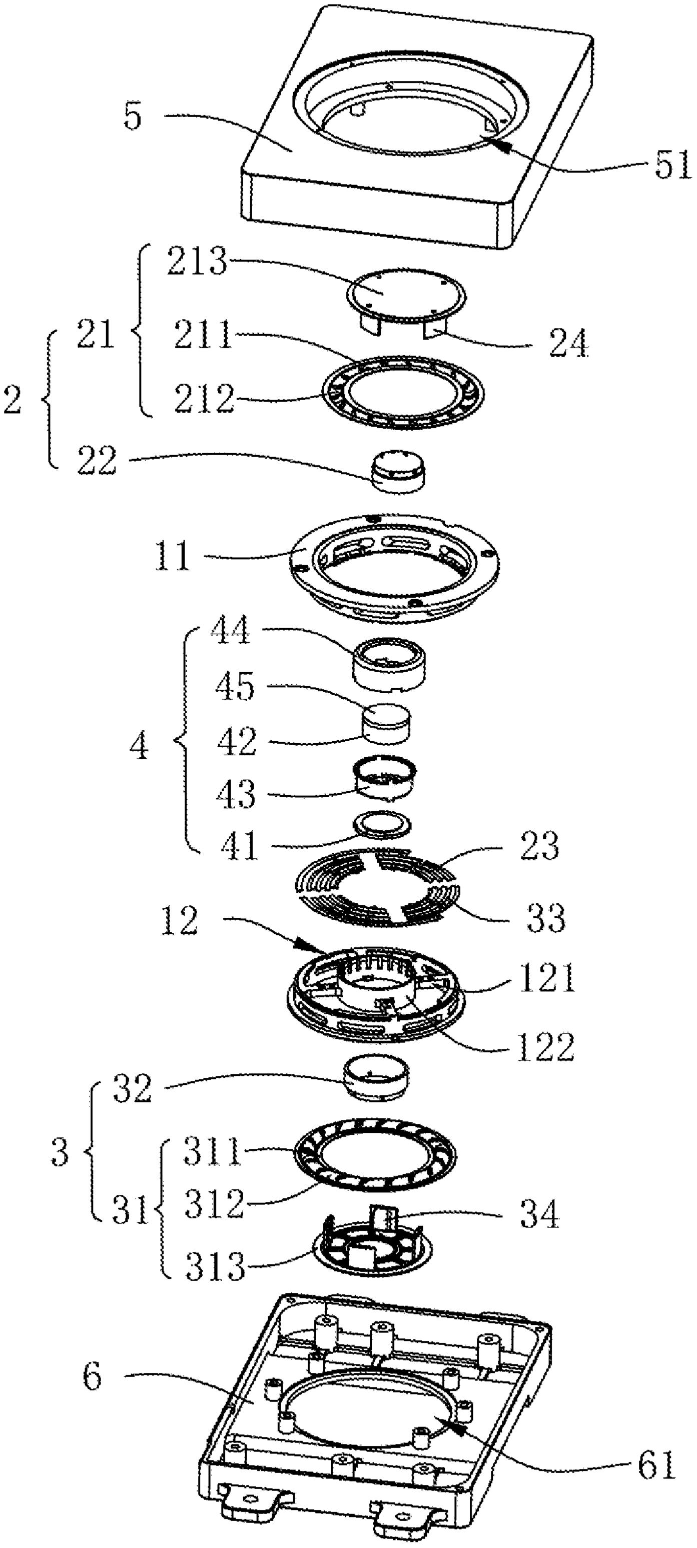
FIG. 1 is a three-dimensional structural schematic diagram of an exploded view of a sound device according to one embodiment of the present disclosure.

Reference numerals in the drawings: 100. sound device; 1. frame; 11. first frame; 12. second frame; 121. fixing arm; 122. circumferential wall; 2. first vibration system; 21. first vibrating diaphragm; 211. first vibrating portion; 212. first folding ring portion; 213. first dome; 22. first voice coil; 23. first elastic component; 24. first supporting column; 3. second vibration system; 31. second vibrating diaphragm; 311. second vibrating portion; 312. second folding ring portion; 313. second dome; 32. second voice coil; 33. second elastic component; 34. second supporting column; 4. magnetic circuit system; 41. second pole core; 42. magnetic steel; 43. support frame; 44. third pole core; 45. first pole core; 5. upper housing; 51. first through hole; 6. lower housing; 61. second through hole; 10. first magnetic gap; 20. second magnetic gap.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Figure 2:
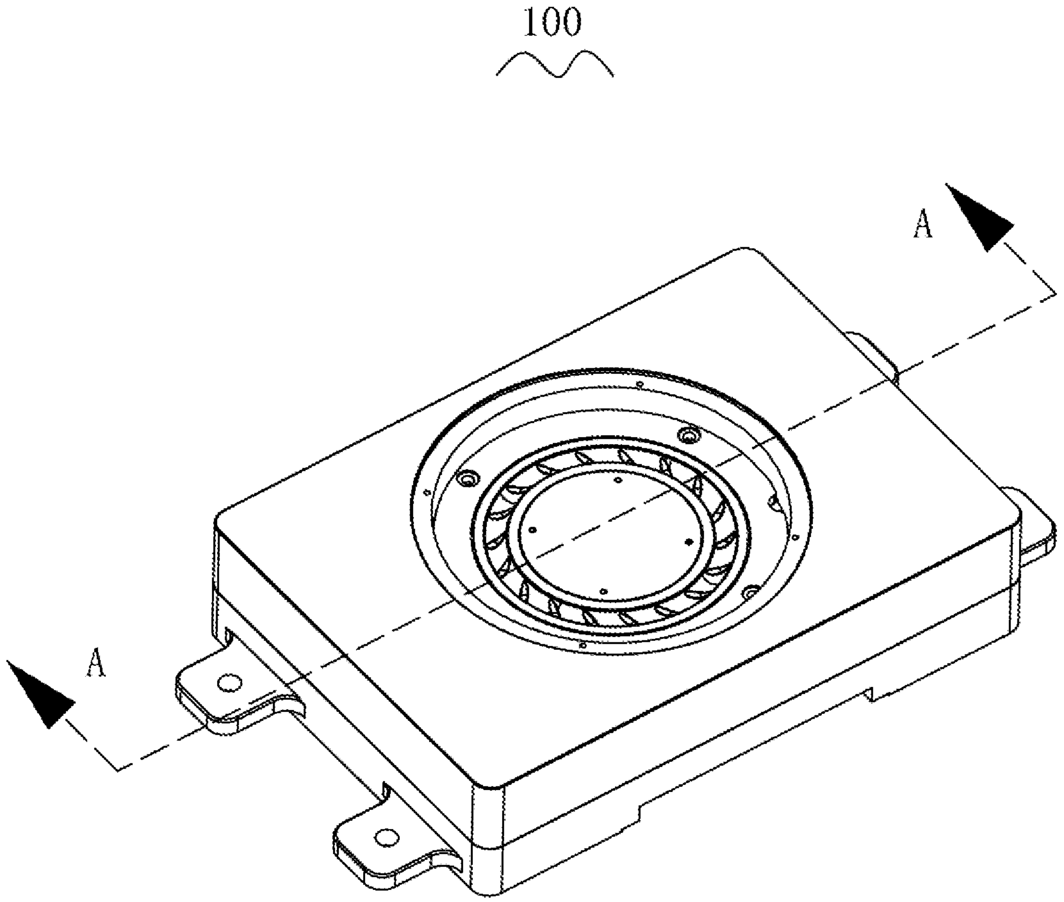
FIG. 2 is a three-dimensional structural schematic diagram of the sound device according to one embodiment of the present disclosure.
Figure 3:
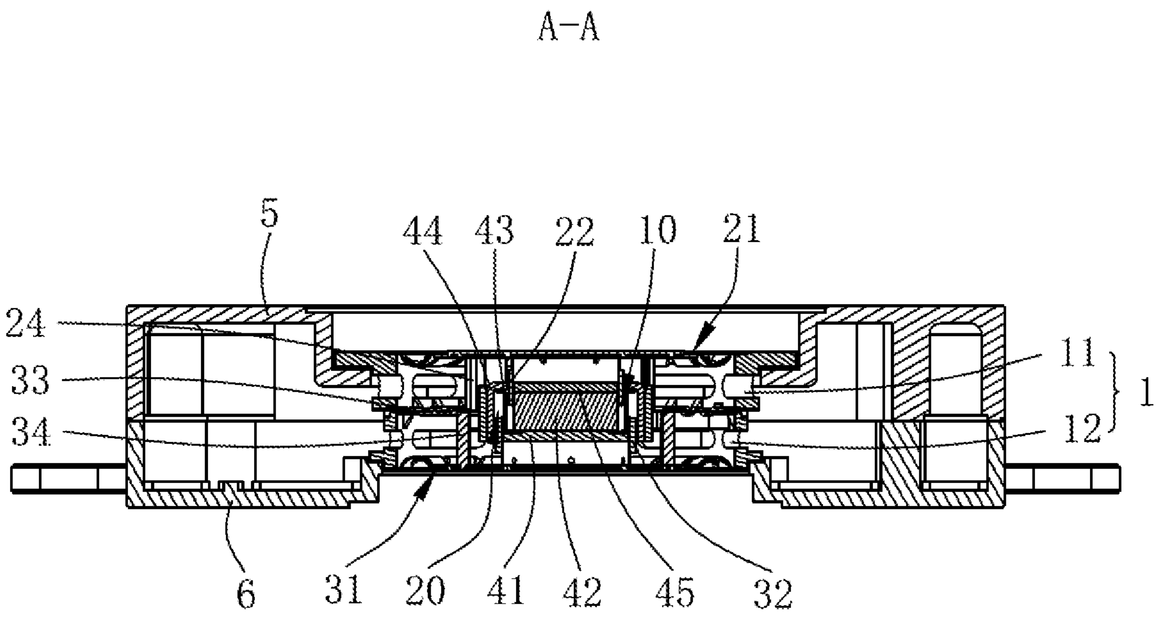
FIG. 3 is a schematic diagram of a cross-sectional view taken along the line A-A shown in FIG. 2.
Figure 4:
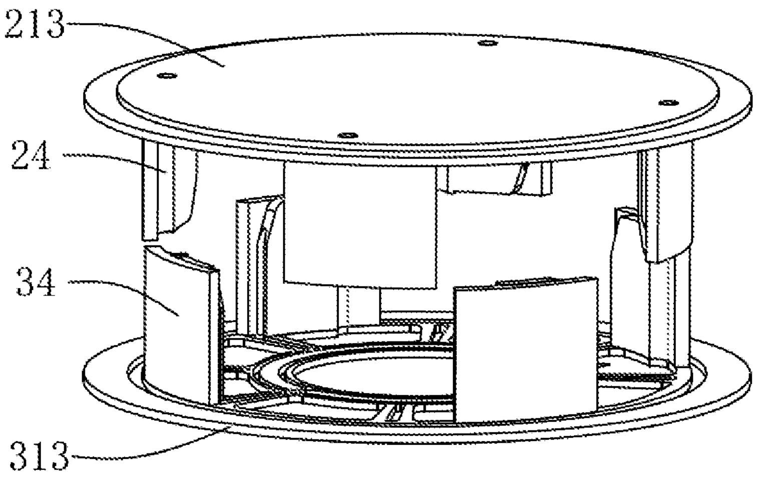
FIG. 4 is a structural schematic diagram of a connection between a first dome and first supporting columns and a connection of a second dome and second supporting columns in the sound device according to one embodiment of the present disclosure.
Figure 5:
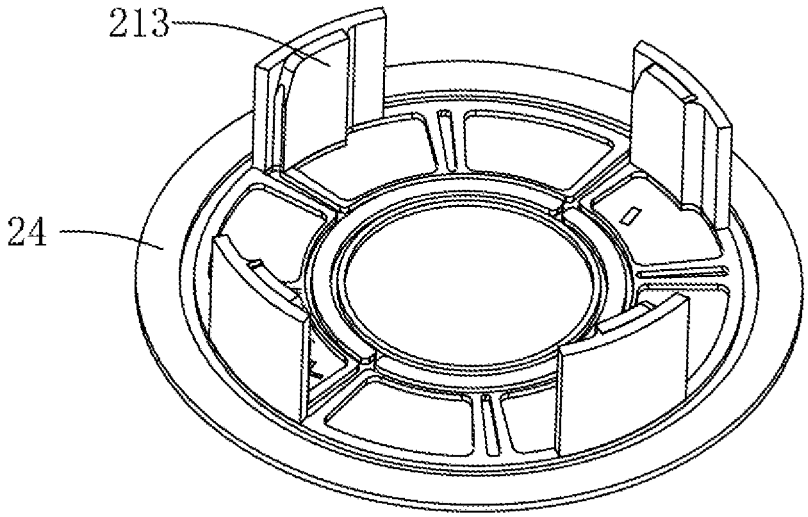
FIG. 5 is a structural schematic diagram of the connection between a first dome and the first supporting columns in the sound device according to one embodiment of the present disclosure.

Referring to FIGS. 1-5, the present disclosure provides a sound device 100, including: a frame 1, a first vibration system 2, a second vibration system 3, and a magnetic circuit system 4.

Specifically, the first vibration system 2 includes a first vibrating diaphragm 21 and a first voice coil 22. The first vibrating diaphragm 21 is fixed to a first side of the frame 1. The first voice coil 22 is configured to drive the first vibrating diaphragm 21 to vibrate and generate sound. The second vibration system 3 includes a second vibrating diaphragm 31 and a second voice coil 32. The second vibrating diaphragm 31 is fixed to a second side of the frame 1. The second voice coil 32 is configured to drive the second vibrating diaphragm 31 to vibrate and generate sound.

Specifically, the magnetic circuit system 4 is fixed to the frame 1 and located between the first vibrating diaphragm 21 and the second vibrating diaphragm 31. A first magnetic gap 10 is defined in one side, close to the first vibration system 2, of the magnetic circuit system 4. A second magnetic gap 20 is defined in one side, close to the second vibration system 3, of the magnetic circuit system 4. The first voice coil 22 is inserted and suspended within the first magnetic gap 10. The second voice coil 32 is inserted and suspended within the second magnetic gap 20.

In the embodiment, the frame 1 includes a first frame 11 and a second frame 12. The second frame 12 is stacked and fixed to the first frame 11.

In the embodiment, the first vibrating diaphragm 21 includes a first vibrating portion 211, a first folding ring portion 212, and a first dome 213. The first folding ring portion 212 is annular. The first folding ring portion 212 is bent and extends from an outer periphery of the first vibrating portion 211. The first dome 213 is attached and fixed to the first vibrating portion 211. An outer periphery of the first folding ring portion 212 is fixed to the frame 1. The second vibrating diaphragm 31 includes a second vibrating portion 311, a second folding ring portion 312, and a second dome 313. The second folding ring portion 312 is annular. The second folding ring portion 312 is bent and extends from an outer periphery of the second vibrating portion 311. The second dome 313 is attached and fixed to the second vibrating portion 311. An outer periphery of the second folding ring portion 312 is fixed to the frame 1. The second dome 313 and the first dome 213 are both metal domes. That is, the second dome 313 and the first dome 213 are both made of metal materials.

The outer periphery of the first folding ring portion 212 is fixed to one side, distal from the second frame 12, of the first frame 11. The outer periphery of the second folding ring portion 312 is fixed to one side, distal from the first frame 11, of the second frame 12. The magnetic circuit system 4 is fixed to the second frame 12.

In the embodiment, one side, distal from the magnetic circuit system 4, of the first dome 213 is of a first plane structure. One side, distal from the magnetic circuit system 4, of the second dome 313 is of a second plane structure.

In the embodiment, the first vibration system 2 further includes a plurality of first elastic components 23 and a plurality of first supporting columns 24. The plurality of the first elastic components 23 are fixed to the frame 1 and disposed at intervals. The plurality of the first supporting columns 24 are disposed at intervals on one side, close to the magnetic circuit system 4, of the first dome 213. One end, distal from the first dome 213, of each of the plurality of the first supporting columns 24 is connected to one of the plurality of the first elastic components 23. In this way, the first dome 213 is better supported through cooperation of the plurality of the first elastic components 23 and the plurality of the first supporting columns 24.

The second vibration system 3 further includes a plurality of second elastic components 33 and a plurality of second supporting columns 34. The plurality of the second elastic components 33 are fixed to the frame 1 and disposed at intervals. The plurality of the second supporting columns 34 are disposed at intervals on one side, close to the magnetic circuit system 4, of the second dome 313. The plurality of the second elastic components 33 and the plurality of the first elastic components 23 are disposed in a staggered mode. One end, distal from the second dome 313, of each of the plurality of the second supporting columns 34 is connected to one of the plurality of the second elastic components 33. In this way, the second dome 313 is better supported through cooperation of the plurality of the second elastic components 33 and the plurality of the second supporting columns 34.

Specifically, the plurality of the first elastic components 23 include four first elastic components, the plurality of the first supporting columns 24 include four first supporting columns. The plurality of the second elastic components 33 include four second elastic components, the plurality of the second supporting columns 34 include four second supporting columns. The plurality of the first elastic components 23 are fixed to one side, close to the second frame 12, of the first frame 11. The plurality of the second elastic components 33 are fixed to one side, close to the first frame 11, of the second frame 12.

In the embodiment, the plurality of the first supporting columns 24 and the first dome 213 are integrally formed in an injection molding insert mode. The plurality of the second supporting columns 34 and the second dome 313 are integrally formed in an injection molding insert mode.

In the embodiment, the magnetic circuit system 4 includes a magnetic steel 42, a first pole core 45, a second pole core 41, a support frame 43, and a third pole core 44. The first pole core 45 is stacked and fixed to one side, close to the first vibrating diaphragm 21, of the magnetic steel 42. The second pole core 41 is stacked and fixed to one side, distal from the first pole core 45, of the magnetic steel 42. The support frame 43 is disposed around the magnetic steel 42 and fixedly connected to the second pole core 41. The third pole core 44 is disposed around the support frame 43 and fixedly connected to one end, distal from the second pole core 41, of the support frame 43. The support frame 43 is disposed at intervals with the magnetic steel 42 and the third pole core 44. The third pole core 44 is fixed to the second frame 12. The first pole core 45 and the third pole core 44 are disposed at intervals to form the first magnetic gap 10. The second pole core 41 and the third pole core 44 are disposed at intervals to form the second magnetic gap 20.

Specifically, the second frame 12 further includes a plurality of fixing arms 121 and a circumferential wall 122. The plurality of the fixing arms 121 extend inwards from a periphery of the one side, close to the first frame 11, of the second frame 12. The circumferential wall 122 is connected to the plurality of the fixing arms 121 and surrounds the third pole core 44. An outer side of the third pole core 44 is attached to an inner side of the circumferential wall 122. This setting facilitates connection between the third pole core 44 and the second frame 12, which does not influence the first voice coil 22 to insert into the first magnetic gap 10, and does not influence the second voice coil 32 to insert into the second magnetic gap 20.

In the embodiment, the plurality of the fixing arms 121 is include four fixing arms, and the four fixing arms 121 are all disposed on a periphery of the second frame 12.

Compared with related art, the sound device 100 of the present disclosure provides double-diaphragm vibration systems, and the first dome 213 in the first vibrating diaphragm 21 and the second dome 313 in the second vibrating diaphragm 31 are made into the metal domes, so that the sound device 100 performs double-sided heat dissipation through the first dome 213 of a metal structure and the second dome 313 of metal structure, which improves heat dissipation effect of the sound device 100, and improves the heat dissipation effect of the vehicle-mounted sound boxes to a great extent when the sound device 100 is applied to the vehicle-mounted sound boxes.

In addition, in order to better protect the sound device 100 or be applied to other devices, the sound device 100 further includes an upper housing 5 and a lower housing 6. The upper housing 5 includes a first through hole 51. The lower housing 6 covers the upper housing 5 and includes a second through hole 61. The second through hole 61 is opposite to the first through hole 51. The first frame 11 is fixed to the upper housing 5 and enables the first vibrating diaphragm 21 to directly face the first through hole 51. The second frame 12 is fixed to the lower housing 6 and enables the second vibrating diaphragm 31 to directly face the second through hole 61. The upper housing 5, the lower housing 6, and the sound device 100 jointly define a sound inner cavity, where the sound inner cavity is not shown in the figures.

In the embodiment, the sound device 100 including the upper housing 5 and the lower housing 6 is directly regarded as a vehicle-mounted sound box.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A sound device, comprising:

a frame;

a first vibration system, a second vibration system; and a magnetic circuit system;

wherein the first vibration system comprises a first vibrating diaphragm and a first voice coil, the first vibrating diaphragm is fixed to a first side of the frame, and the first voice coil is configured to drive the first vibrating diaphragm to vibrate and generate sound;

the second vibration system comprises a second vibrating diaphragm and a second voice coil, the second vibrating diaphragm is fixed to a second side of the frame, and the second voice coil is configured to drive the second vibrating diaphragm to vibrate and generate sound;

the magnetic circuit system is fixed to the frame and located between the first vibrating diaphragm and the second vibrating diaphragm, a first magnetic gap is defined in one side, close to the first vibration system, of the magnetic circuit system; a second magnetic gap is defined in one side, close to the second vibration system, of the magnetic circuit system; the first voice coil is inserted and suspended within the first magnetic gap, and the second voice coil is inserted and suspended within the second magnetic gap;

the first vibrating diaphragm comprises a first vibrating portion, a first folding ring portion, and a first dome; the first folding ring portion is annular, the first folding ring portion is bent and extends from an outer periphery of the first vibrating portion; the first dome is attached and fixed to the first vibrating portion; and an outer periphery of the first folding ring portion is fixed to the frame; and the second vibrating diaphragm comprises a second vibrating portion, a second folding ring portion, and a second dome; the second folding ring portion is annular, the second folding ring portion is bent and extends from an outer periphery of the second vibrating portion; the second dome is attached and fixed to the second vibrating portion; an outer periphery of the second folding ring portion is fixed to the frame; and the second dome and the first dome are both metal domes;

wherein the first vibration system further comprises a plurality of first elastic components and a plurality of first supporting columns, the plurality of the first elastic components are fixed to the frame and disposed at intervals, the plurality of the first supporting columns are disposed at intervals on one side, close to the magnetic circuit system, of the first dome; and one end, distal from the first dome, of each of the plurality of the first supporting columns is connected to one of the plurality of the first elastic components; and the second vibration system further comprises a plurality of second elastic components and a plurality of second supporting columns, the plurality of the second elastic components are fixed to the frame and disposed at intervals, the plurality of the second supporting columns are disposed at intervals on one side, close to the magnetic circuit system, of the second dome; the plurality of the second elastic components and the plurality of the first elastic components are disposed in a staggered mode; and one end, distal from the second dome, of each of the plurality of the second supporting columns is connected to one of the plurality of the second elastic components;

wherein the plurality of the first elastic components comprise four first elastic components, the plurality of the first supporting columns comprise four first supporting columns, the plurality of the second elastic components comprise four second elastic components, and the plurality of the second supporting columns comprise four second supporting columns.

2. The sound device according to claim 1, wherein one side, distal from the magnetic circuit system, of the first dome is of a first plane structure; and one side, distal from the magnetic circuit system, of the second dome is of a second plane structure.

3. The sound device according to claim 1, wherein the plurality of the first supporting columns and the first dome are integrally formed in an injection molding insert mode; and the plurality of the second supporting columns and the second dome are integrally formed in an injection molding insert mode.

4. The sound device according to claim 1, wherein the frame comprises a first frame and a second frame, the second frame is stacked and fixed to the first frame; the outer periphery of the first folding ring portion is fixed to one side, of the first frame, distal from the second frame the outer periphery of the second folding ring portion is fixed to one side, of the second frame, distal from the first frame; the magnetic circuit system is fixed to the second frame; the plurality of the first elastic components are fixed to one side, of the first frame, close to the second frame; and the plurality of the second elastic components are fixed to one side, of the second frame, close to the first frame.

5. The sound device according to claim 4, wherein the magnetic circuit system comprises a magnetic steel, a first pole core, a second pole core, a support frame, and a third pole core; the first pole core is stacked and fixed to one side, close to the first vibrating diaphragm, of the magnetic steel; the second pole core is stacked and fixed to one side, distal from the first pole core, of the magnetic steel; the support frame is disposed around the magnetic steel and fixedly connected to the second pole core; the third pole core is disposed around the support frame and fixedly connected to one end, distal from the second pole core, of the support frame; the support frame is disposed at intervals with the magnetic steel and the third pole core, the third pole core is fixed to the second frame; the first pole core and the third pole core are disposed at intervals to form the first magnetic gap, and the second pole core and the third pole core are disposed at intervals to form the second magnetic gap.

6. The sound device according to claim 5, wherein the second frame further comprises a plurality of fixing arms and a circumferential wall, the plurality of the fixing arms extend inward from a periphery of the one side, close to the first frame, of the second frame; the circumferential wall is connected to the plurality of the fixing arms and surrounds the third pole core, and an outer side of the third pole core is attached and fixed to an inner side of the circumferential wall.

7. The sound device according to claim 4, wherein the sound device further comprises an upper housing and a lower housing, the upper housing comprises a first through hole, the lower housing covers the upper housing and comprises a second through hole, the second through hole is disposed opposite to the first through hole; the first frame is fixed to the upper housing and enables the first vibrating diaphragm to directly face the first through hole, the second frame is fixed to the lower housing and enables the second vibrating diaphragm to directly face the second through hole; and the upper housing, the lower housing, and the sound device jointly define a sound inner cavity.

* * * * *